July 26, 1927.
A. R. JAYNE
1,637,256
STEEL VEHICLE WHEEL
Filed March 21, 1925      2 Sheets-Sheet 2
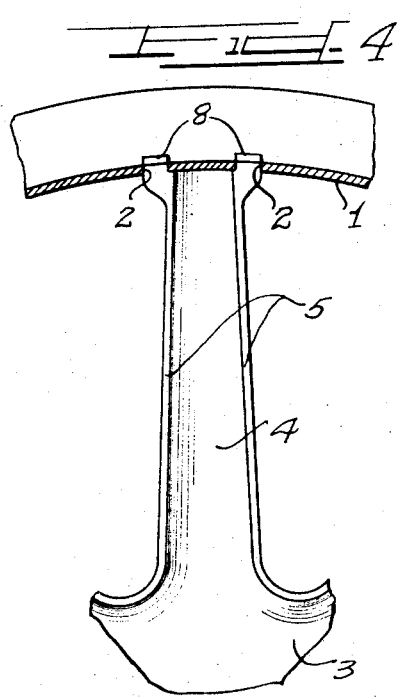
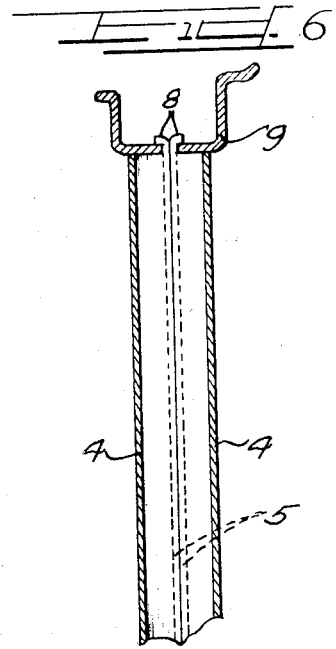
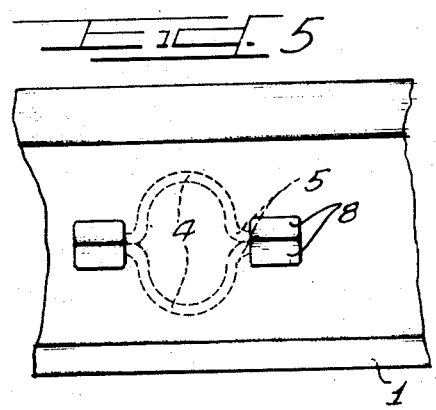
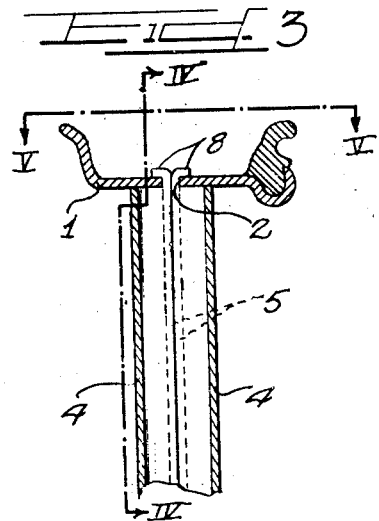
INVENTOR
Ames Rowles Jayne
By Charles W. Hills
Atty Patented July 26, 1927.

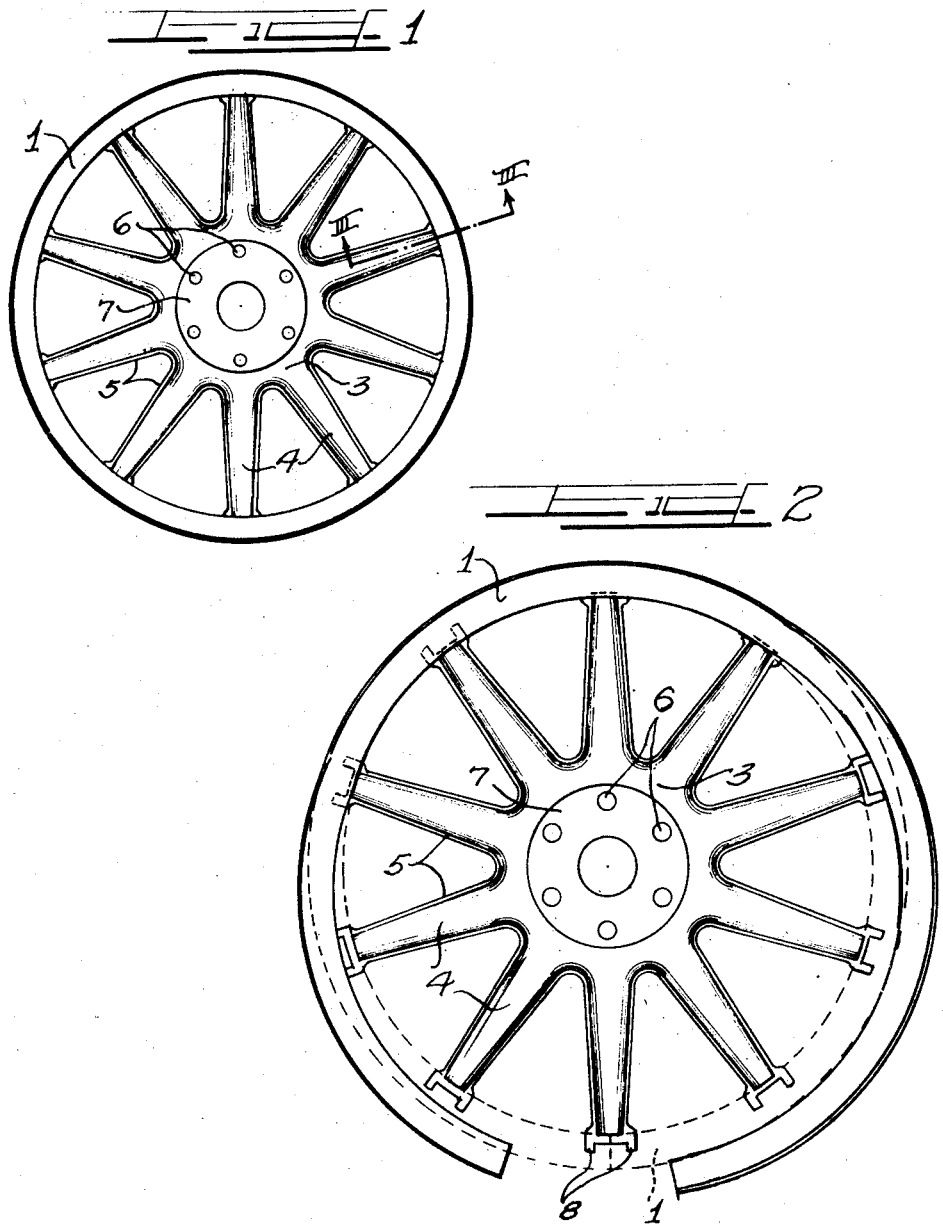

1,637,256

UNITED STATES PATENT OFFICE.

AMES BOWLES JAYNE, OF CHICAGO, ILLINOIS, ASSIGNOR TO AMERICAN STEEL WHEEL CORPORATION, OF CHICAGO, ILLINOIS, A CORPORATION OF ILLINOIS.

STEEL VEHICLE WHEEL.

Application filed March 21, 1925. Serial No. 17,248.

This invention relates to metal vehicle wheels and more particularly to wheels formed from a pair of metal wheel halves, the spoke members of which are provided with projections or lugs adapted to be secured either to the rim or felloe of a wheel.

It is an object of this invention to provide a metal vehicle wheel wherein a pair of abutting hub spoke members are adapted to be secured within a rim section by means of lugs formed on said hub spoke sections.

It is also an object of this invention to provide a wheel wherein punched and formed wheel halves having projections integrally formed thereon are adapted to be engaged through openings in a rim or felloe and bent over to rigidly hold the wheel halves and the rim or felloe in assembled relation to form a completed wheel.

It is a further object of this invention to provide a wheel wherein a pair of formed wheel halves are adapted to have parts thereof projecting into engagement with a rim section to hold the wheel halves and rim section assembled without the use of rivets or bolts.

It is furthermore an object of the invention to provide a two-piece spoked sheet metal wheel wherein the separate halves are secured together at the hub while the ends of the spokes are provided with lugs which are adapted to be projected through openings in a rim or felloe and then bent over to hold the wheel halves and rim properly assembled with the intermediate portions of the spokes between the hub and rim being pressed together by slightly bowing the same before assembling to obtain resilient spokes capable of slight yielding to absorb shocks without permanent distortion.

Still another object of the invention is to provide a wheel wherein a pair of abutting wheel halves are adapted to be rigidly secured within a rim or felloe without the use of rivets or bolts.

It is an important object of this invention to provide an improved metal wheel of simple and improved construction consisting of a minimum number of parts and obviating the use of rivets and bolts.

Other and further important objects of this invention will be apparent from the disclosures in the specification and the accompanying drawings.

This invention (in a preferred form) is illustrated in the drawings and hereinafter more fully described.

On the drawings:

Figure 1 is a side elevation of a vehicle wheel embodying the features of this invention.

Figure 2 is a slightly enlarged side elevation of a wheel showing the method of assembly.

Figure 3 is an enlarged fragmentary detail section taken on line III—III of Figure 1.

Figure 4 is a fragmentary detail section taken on line IV—IV of Figure 3.

Figure 5 is a fragmentary circumferential view taken on line V—V of Figure 3 showing the spoke in dotted lines.

Figure 6 is a view similar to Figure 3 showing a spoke rigidly secured to a felloe instead of directly to a rim.

As shown on the drawings:

The reference numeral 1 indicates a metal wheel rim of any desired design or construction, said rim being provided with a plurality of sets of circumferentially positioned apertures or openings 2 preferably elongated longitudinally of the rim. Positioned within the rim 1 are a pair of abutting one-piece wheel halves formed by punching and pressing unitary blanks from sheet metal. The wheel halves each comprise a hub disc 3 and a plurality of radially directed spoke halves 4 which taper outwardly and are of a substantially semicircular form with the margins of said spokes being formed to provide integral outwardly directed flanges 5. The flanges 5 of the spokes form the mating or abutting surfaces between the wheel halves. The spokes and flanges are pressed to form a slight convex curve on the order of a hyperbola, the curve having a variable radius least at the center of the length of the spokes and greatest at the ends of the spokes to concentrate the initial bend or deformation at the center of the spokes.

The disc portions 3 of the wheel halves are adapted to be slipped over a wheel hub provided with apertured bosses for receiving bolts 6 which project through apertured outer discs 7.

The outer ends of the spoke flanges 5 are widened to form flat-faced ears and project outwardly beyond the ends of the spokes proper to preferably form elongated lugs or fingers 8 lying in the plane of the flat-faced ears and approximately one-half the width of the openings 2. The lugs 8 of abutting spoke halves register with one another when the spoke-halves are placed together and each set of contacting lugs are adapted to be projected through a single aperture 2 formed in the rim 1 after the various sets of lugs 8 are projected through all of the rim apertures, said lugs are then bent away from one another against the outer peripheral surface of the rim as clearly illustrated in Figure 5, thereby rigidly securing the abutting spoke halves within the rim of the wheel.

Figure 2 shows a method which may be used in assembling the wheel, this method consisting of first placing two formed wheel halves in abutting relation and securing the same together by means of the discs 7 and the bolts 6, after which the split rim 1 is placed around the wheel halves as indicated in full lines in Figure 2. The split rim 1 is then constricted into dotted line position of Figure 2 permitting the lugs 8 to be projected through the apertures 2 in the wheel rim 1. The abutting ends of the rim may be secured together by any suitable means after which the lugs 8 are bent over as illustrated in Figures 3 and 5 to form the assembled wheel.

It will thus be noted that the wheel may be assembled without the use of rivets or bolts for the purpose of connecting the ends of the spokes with the rim 1. The construction is a very simple one and permits metal wheels of the class described to be manufactured at greatly reduced costs without in any way impairing the strength of the wheels. If desired, each pair of outwardly bent lugs 8 may be line welded. This construction will serve to obviate any tendency of the lugs being pulled through the apertures in the wheel rim.

The lug construction at the ends of the spokes permits the lugs to be engaged through the rim at a plurality of positions thereby affording a wheel construction wherein the ends of the spoke are held against a turning movement with respect to the wheel rim.

In bolting the two wheel halves together at the hub, the spokes are drawn tightly together around their abutting flanges 5 with an initial stress sufficient to maintain a tight joint without welding or riveting though welding may be resorted to if desired. The hyperbolic curve given the flanges has been found to give the most uniform distribution of pressure along the entire length of the flange joints. It will be noted that such a joint produces a wheel which will have lateral resiliency due to the ability of the joints to permit relative movement of the two spoke halves without in any way lessening the strength of the wheel in other particulars.

If desired, two wheel halves may be placed in contacting relation with the lugs 8 of the spokes of the respective wheel halves contacting one another. The two wheel halves may then be placed within a closed rim, with the ends of the lugs positioned to register with the apertures within the rim.

The initial bowing or curvature given the spoke halves results in slightly shortening the spoke halves in their free condition. The spoke halves are therefore made slightly longer than would be possible without bending and are expanded into position against the rim when the spoke halves are brought together by tightening the hub sections together by means of the discs 7 and bolts 6. The rim is thus tensioned while the spokes are compressed thereby insuring very firm contact between the spokes and the rim. The ends of the lugs 8 projecting through the rim apertures are bent over at substantially right angles as indicated, thereby forming a complete wheel. The bent over lugs may be line welded if desired to form a wheel of greater strength.

Figure 6 illustrates a modified construction wherein the lugs 8 of the spoke halves 4 are projected through openings in a wheel felloe 9, and then bent over as indicated to hold the spoke secured to said felloe. In this construction it will be noted that the spokes are secured to a wheel felloe instead of being directly connected to the wheel rim. Figure 6 illustrates an arrangement wherein the metal wheel provided is of the demountable rim type while Figure 3 illustrates a wheel construction which is demountable at the hub.

I am aware that many changes may be made and numerous details of construction may be varied through a wide range without departing from the principles of this invention, and I therefore do not purpose limiting the patent granted hereon, otherwise than necessitated by the prior art.

I claim as my invention:

1. A metallic wheel comprising a rim section apertured at intervals around its circumference and a pair of abutting wheel halves having spoke portions, each spoke portion of each wheel half being provided at its outer end with a pair of projecting lugs spaced apart the width of the outer eye of the spoke portion and which extend through the said apertures in the rim section and having their free ends bent over to clamp the rim and wheel halves together.

2. A metallic wheel comprising a rim section apertured at intervals around its circumference, the apertures being elongated longitudinally of the rim, a pair of abutting wheel-halves having spoke portions, each spoke portion of each wheel-half being provided at its outer end with a pair of elongated projecting lugs spaced apart the width of the outer end thereof and which extend through the said apertures in the rim section and having their free ends bent over in a direction transversely of the rim to clamp the rim and wheel-halves together.

3. A metallic wheel comprising a rim section having a single line of elongated apertures around its circumference, a pair of abutting wheel-halves having radial spoke portions, each spoke portion of each wheel-half being provided at its outer end with a pair of elongated projecting lugs spaced apart the width of the outer end thereof and which extend through said elongated apertures of the rim section, each of said elongated apertures being sufficiently wide transversely to receive a pair of contacting lugs, one on each wheel-half, the free ends of said lugs of opposite wheel-halves being bent oppositely to each other upon the outer side of the rim section to clamp the rim section and wheel-halves together.

4. A metallic wheel comprising a rim section having a single line of elongated apertures around its circumference, a pair of abutting wheel-halves having radial spoke portions, each spoke portion of each wheel-half being widened at its upper end to form a flat-faced ear which is projected outwardly to provide an elongated lug at opposite sides thereof and which extend through said elongated apertures of the rim section, each of said elongated apertures being sufficiently wide transversely to receive a pair of contacting lugs, one on each wheel-half, the free end of said lugs of opposite wheel-halves being bent oppositely to each other upon the outer side of the rim section to clamp the rim section and wheel-halves together.

5. A metallic wheel comprising a rim section having a single line of elongated apertures around its circumference, a pair of abutting wheel-halves having radial spoke portions, each spoke portion of each wheel-half being provided with an edge flange at each side which is widened at its upper end to form a flat-faced ear which is projected outwardly to provide an elongated lug at opposite sides thereof and which extend through said elongated apertures of the rim section, each of said elongated apertures being sufficiently wide transversely to receive a pair of contacting lugs, one on each wheel half, the free end of said lugs of opposite wheel-halves being bent oppositely to each other upon the outer side of the rim section to clamp the rim section and wheel-halves together.

In testimony whereof I have hereunto subscribed my name.

AMES ROWLES JAYNE.